A. ROGGENMOSER.
MACHINE FOR CUTTING BONES.
APPLICATION FILED MAY 14, 1913.

1,132,976. Patented Mar. 23, 1915.

Witnesses
H. C. Harwood
A. S. Dennison

Inventor:
Adolf Roggenmoser
By B. Singer
Attorney

THE NORRIS PETERS CO., PHOTO-LITHO., WASHINGTON, D. C.

UNITED STATES PATENT OFFICE.

ADOLF ROGGENMOSER, OF ZURICH, SWITZERLAND.

MACHINE FOR CUTTING BONES.

1,132,976.   Specification of Letters Patent.   Patented Mar. 23, 1915.

Application filed March 14, 1913. Serial No. 754,327.

*To all whom it may concern:*

Be it known that I, ADOLF ROGGENMOSER, merchant, a citizen of the Swiss Confederation, residing at Unterer Muhlesteg 2, Zurich, Switzerland, have invented a new and useful Machine for Cutting Bones, of which the following is a specification.

The present invention relates to improvements in machines for cutting bones in small particles adapted to serve as food for poultry and the like.

The object of my improvement is to provide a machine which will grind green bones with a minimum amount of material sticking to the grinding disks and which will reduce the object worked on to as small a size as possible before the grinding operation must be discontinued. I attain these objects by the means illustrated in the accompanying drawings, in which—

Figure 1:
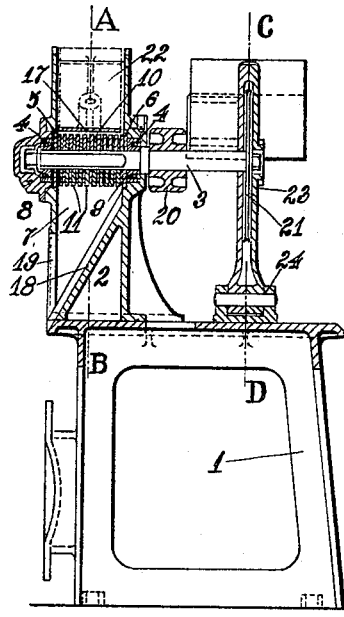
Figure 2:
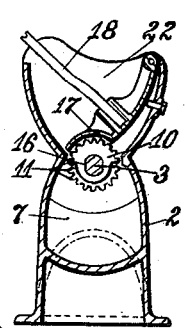
Figure 3:
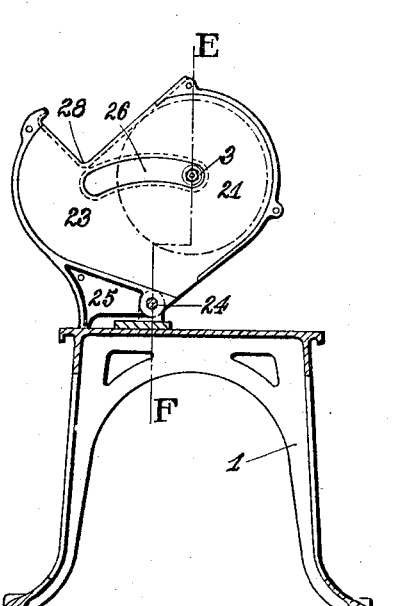
Figure 4:
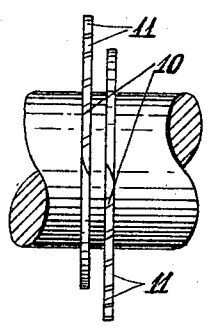
Figures 5, 5A:
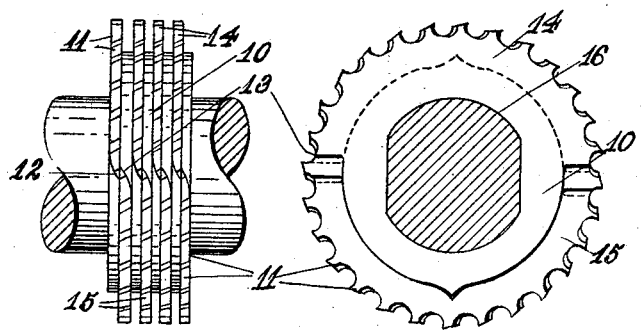

Figure 1 is a vertical section of the entire machine. Figs. 2 and 3 are vertical sections on line A—B and C—D of Fig. 1 respectively. Fig. 4 shows a detached element of one form of the cutting tool in a side view. Fig. 5 shows a detached element of the preferred form of cutting tool in side view. Fig. 5ª is a view of the cutting element shown in Fig. 5 taken at right angles thereto.

Similar letters refer to similar parts throughout the several views.

The machine comprises a bed 1 upon which a frame 2 is rigidly fixed having a vertical channel 7 of rectangular cross section of varying dimension. In the frame 2 a shaft 3 crossing said channel 7 is rotatably mounted in suitable ball bearings 4. On the shaft 3 two disks 5, 6 are fixed which are in recesses 8, 9 of the inner walls of the channel 7. The inner sides of the said disks 5, 6 are flush with the inner side walls of the channel 7. Between the disks 5, 6 a row of blades 10 are arranged each of which having teeth 11 along the one half of its circumference the other half being smooth, the smooth portion of the circumference being cut down deeper than the toothed portion so as to provide a larger amount of space for the bone particles to drop into. The blades 10 are arranged on the shaft 3 in such a manner that the toothed rims 14, 15 of two consecutive blades 10 are set 180° apart, two blades 10 giving together a full rim of teeth 11. The contiguous parts 12, 13 of the toothed parts of two consecutive blades 10 are slightly bent in such a manner that no interruption between the toothed rims 14, 15 occurs. The close contact between the consecutive tooth rims tends to prevent the formation of ridges in the bones being cut. This tendency is also avoided by the fact that the teeth on one blade incline in one direction whereas the teeth on the following blade incline in the opposite direction relatively to the direction of rotation. This opposing connection of the teeth causes the bone to work slightly in opposite directions parallel to the axis of rotation as the cutters revolve and thus helps to prevent the formation of ridges. The opposite inclination of the teeth likewise throws the cut particles from one set of teeth into a different channel from that to which the particles from the other set is delivered. It will be seen moreover that the absence of teeth from an entire half of the circumference of a given disk prevents particles of bones from sticking to the disks and clogging their operation since the cut particles have an entire half revolution in which they are unsupported and in which they can drop from the disks. The clogging tendency, moreover, is greatly curtailed by the fact that the untoothed portions are cut lower than the toothed portions thus giving considerable space below the teeth in which the cut particles can fall. The shaft 3 is provided with two parallel flat sides and the blades 10 have corresponding bores 16. The blades 10 are thereby secured against rotation on shaft 3.

In the upper part 22 of the channel 7 a flap 17 is journaled in the side walls of the channel 7 said flap being provided with a handle 18. The flap 17 may be swung out of the channel 7 into which the bones to be cut are brought. The bones are then pressed against the blades 10 by means of the flap 17 and the small particles of the bones which are cut off by the teeth 11 of the blades 10 pass on to the grooves on both sides of a toothed rim 14, 15 and from there to a slanting wall 18 arranged in the lower part of the frame 2. The particles may pass through an opening 19 of the frame 2 into a receptacle not shown in the drawing.

On the shaft 3 a pulley 20 is fixed and moreover a disk saw 21 for cutting larger bones apart that they may be placed into the hopper 22. The disk saw is surrounded by a swinging frame 23 pivoted at 24 to the bed 1 of the machine. The frame 23 is provided with a foot 25 by means of which the frame rests on the bed when not in use. The frame 23 is moreover provided with a curved slot 26 through which passes the shaft 3. The form and arrangement of the slot 26 is such that the frame 23 may swing freely about its pivot. The frame 23 is further provided with a rest 28 on which the bone is fed against the disk saw 21 by swinging the frame 23 holding the bone firmly against the rest 28. In the bed 1 room is left for an electromotor for driving said shaft 3.

What I claim to secure by Letters Patent is:

1. A machine for cutting bones comprising in combination a frame, provided with a vertical channel, a shaft rotatably mounted in said frame and crossing said channel, blades fixed to said shaft having teeth upon one half of their circumference only the toothed parts of two consecutive blades being set 180° apart, means to feed the bones against said blades, means to guide off the bone-particles and means to rotate said shaft.

2. A machine for cutting bones comprising in combination, a plurality of cutting disks each of which has teeth on approximately 180° of its circumference, the remaining 180° being smooth, the toothed portion on one disk being arranged in axial alinement with the smooth portion of the adjacent disk, means for rotating said disks, and means for feeding material to be ground.

3. A machine for cutting bones comprising in combination, a shaft, a plurality of toothed disks arranged side-by-side on said shaft, said disks having teeth on slightly more than 180° of their circumferences the remaining portion of their circumferences being smooth and being cut away lower than the level of the toothed portions, the toothed portion on one disk being arranged in axial alinement with the smooth portion of the adjacent disk and with its toothed portion overlapping slightly the toothed portions of both adjacent disks, the points where the teeth overlap being bent together so as to prevent the formation of ridges, and means for rotating said shaft.

In testimony whereof I affix my signature in presence of two witnesses.

ADOLF ROGGENMOSER.

Witnesses:
CARL CRAVEN,
AUGUST RUÈGG.

Copies of this patent may be obtained for five cents each, by addressing the "Commissioner of Patents, Washington, D. C."